(12) United States Patent
Watanabe et al.

(10) Patent No.: US 7,721,306 B2
(45) Date of Patent: May 18, 2010

(54) BANDWIDTH SHARING (75) Inventors: Setsuko Watanabe, San Diego, CA (US); Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 829 days.

(21) Appl. No.: 11/415,828

(22) Filed: May 2, 2006

(65) Prior Publication Data

US 2007/0192820 A1 Aug. 16, 2007

Related U.S. Application Data

(60) Provisional application No. 60/774,022, filed on Feb. 15, 2006.

(51) Int. Cl.
*H04N 7/10* (2006.01)
*H04N 7/025* (2006.01)

(52) U.S. Cl. .............. 725/32; 725/36; 725/63; 725/68; 725/70; 455/427

(58) Field of Classification Search ............. 725/32–36, 725/63–72
See application file for complete search history.

(56) References Cited

U.S. PATENT DOCUMENTS

| | | | |
|---|---|---|---|
| 5,155,591 A | | 10/1992 | Wachob |
| 5,699,355 A | * | 12/1997 | Natarajan ............... 370/322 |
| 5,774,170 A | * | 6/1998 | Hite et al. ............... 725/35 |
| 5,886,995 A | * | 3/1999 | Arsenault et al. ......... 725/63 |
| 6,216,117 B1 | * | 4/2001 | Hall ....................... 705/400 |
| 6,574,793 B1 | | 6/2003 | Ngo et al. |
| 6,728,269 B1 | * | 4/2004 | Godwin et al. ........... 725/35 |
| 6,742,183 B1 | * | 5/2004 | Reynolds et al. ......... 725/32 |
| 6,938,268 B1 | * | 8/2005 | Hodge ..................... 725/93 |
| 7,242,945 B2 | * | 7/2007 | Reddi ..................... 455/446 |
| 2001/0013125 A1 | | 8/2001 | Kitsukawa et al. |
| 2002/0026638 A1 | | 2/2002 | Eldering et al. |
| 2002/0059590 A1 | | 5/2002 | Kitsukawa et al. |
| 2002/0073421 A1 | | 6/2002 | Levitan et al. |
| 2002/0129362 A1 | | 9/2002 | Chang et al. |
| 2002/0161838 A1 | | 10/2002 | Pickover et al. |
| 2002/0178445 A1 | | 11/2002 | Eldering et al. |
| 2003/0037332 A1 | | 2/2003 | Chapin et al. |
| 2003/0202773 A1 | | 10/2003 | Dow et al. |
| 2004/0128682 A1 | | 7/2004 | Liga et al. |

(Continued)

*Primary Examiner*—Scott Beliveau
*Assistant Examiner*—Jeremy Duffield
(74) *Attorney, Agent, or Firm*—Miller Patent Services; Jerry A. Miller (57) ABSTRACT

A method for bandwidth sharing between first and second satellite television networks involves receiving a shared video data stream shared between the satellite television networks; receiving advertisement metadata forming a part of the shared video data stream, the advertisement meta-data containing identifying information that identifies the advertisement as being associated with one of the satellite television networks; determining which of the satellite television networks the advertisement is associated with by reading the identifying information; if the first satellite television network is identified as associated with the advertisement, then outputting the advertisement as a video signal; and if the second satellite television network is identified as associated with the advertisement, then identifying an advertisement that is possibly stored in an advertisement cache, retrieving the advertisement from the advertisement cache and outputting the stored advertisement as a video signal. This abstract is not to be considered limiting.

25 Claims, 4 Drawing Sheets

U.S. PATENT DOCUMENTS

2004/0237102 A1 11/2004 Konig et al.
2005/0278743 A1 12/2005 Flickinger et al.
2005/0283797 A1 12/2005 Eldering et al.

* cited by examiner

BANDWIDTH SHARING

CROSS REFERENCE TO RELATED DOCUMENTS

This application is related to and claims priority benefit of provisional application No. 60/774,022 filed Feb. 15, 2006 which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The cost of satellite bandwidth for transmission of television programming to subscribers is extremely high. As satellite service operators take steps to broadcast in high definition and provide additional services, more bandwidth is needed, further increasing costs. These high costs make it difficult for satellite television service providers to compete with land-based cable operators and even the Internet in providing content to viewers.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

With the current commercial leaders in satellite television broadcasting, a large percentage of the content being broadcast is redundant. For example approximately 65% of the content offered by satellite providers DirecTV™ and EchoStar™ is redundant. It would be advantageous to both parties to share satellite broadcasts of the redundant content. Sharing of the content itself can be accomplished sharing the keys used in their respective conditional access systems. However, the problem is somewhat more complex than simply using key sharing to share content. In order to totally replicate the original single network experience and business model for the operators, the individual networks should also be provided with a mechanism to allow them to run individualized network advertisements, as in the present business model.

In accordance with certain embodiments consistent with the present invention, advertisement caching on a hard disc drive can be utilized to permit adversarial satellite television providers to continue to compete, share bandwidth, and retain their individuality by virtue of utilizing the same advertisements currently utilized with their present business model.

While this scenario asks adversaries to cooperate to a certain extent, it allows them to run their network advertisements while simultaneously permitting them to recapture bandwidth in order to be more competitive with cable television systems, telephone operators, and the Internet in providing content to viewers.

Figure 1:
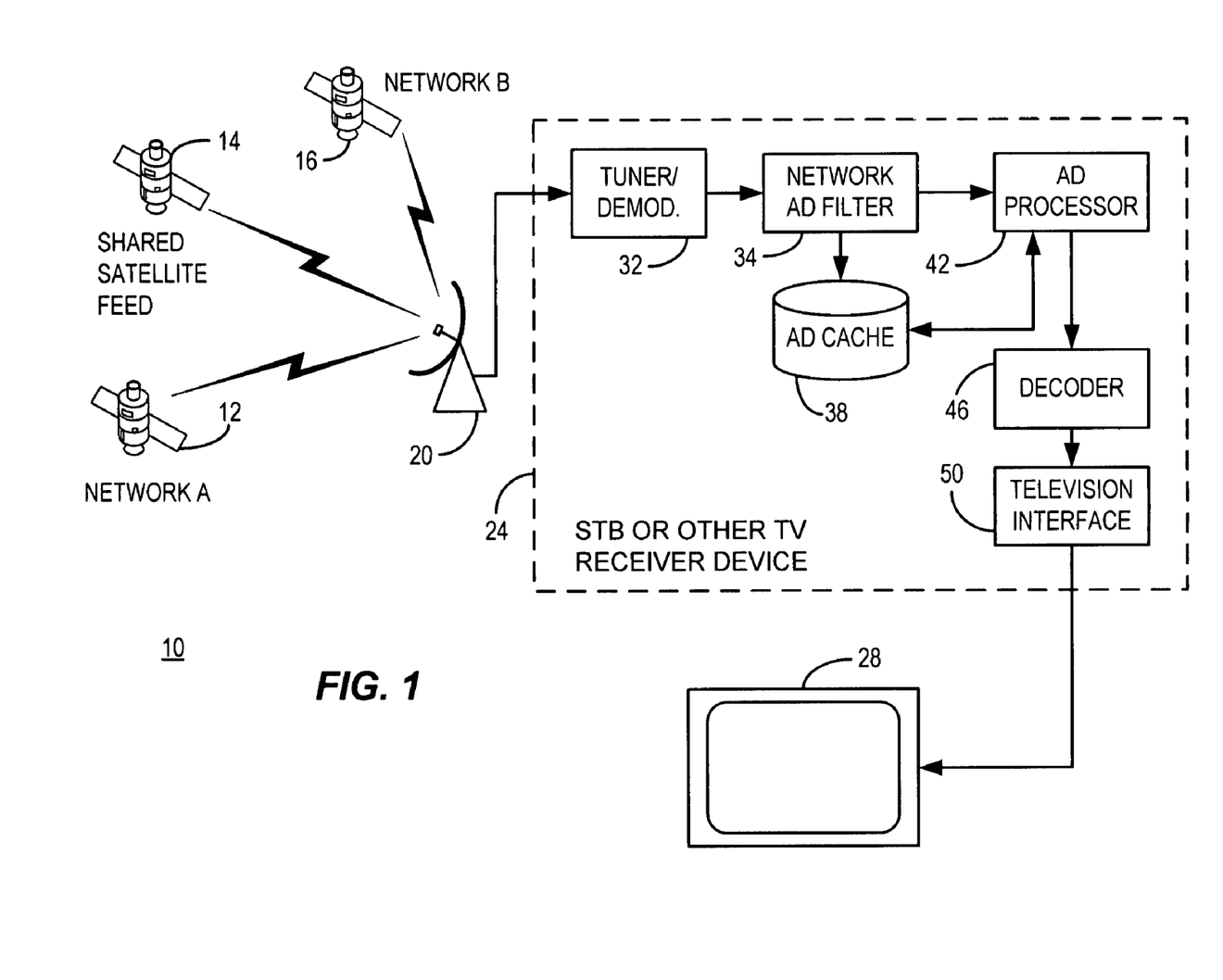
FIG. 1 is a block diagram of a system consistent with certain embodiments of the present invention.

FIG. 1 depicts one embodiment of a system 10 which permits satellite bandwidth sharing between two networks (network A and network B) while permitting each of the networks to retain their individual network commercial content or other similar types of content that can be associated with either of the networks. For ease of illustration, FIG. 1 depicts three satellites, 12, 14, and 16. It will be appreciated by those skilled in the art upon consideration of the present teachings that the depiction of three satellites as shown with one satellite devoted to one network, one satellite devoted to the other network, and a third satellite devoted to shared content is only one arrangement, but is used to facilitate ease of understanding embodiments consistent with the present invention. In other embodiments, the shared content can be carried on satellites which also carry content from network A and/or network B without limitation.

As illustrated, transmissions from each of satellites 12, 14, and 16 are received by a satellite receiver dish antenna and associated low noise block 20. The received signal from the satellite antenna 20 is then passed to a set-top box or other television receiver device 24 for conversion to a television or display output that can be displayed on television or display 28. In this embodiment, the receiver device 24 incorporates a tuner/demodulator 32 (which may actually be implemented as multiple tuner/demodulator devices in some embodiments) that receives, tunes and demodulates content from the three satellites, 12, 14, and 16. Its demodulated output is then passed to a network advertisement filter 34 which identifies advertisement content that is associated with the network to which receiver 24 is associated (by virtue of subscription) into an advertisement cache 38. Advertisement cache may, for example, be in the form of a hard disc drive (or other mass storage system) such as those which are now commonly a part of a digital video recorder/set-top box combination (i.e., a DVR—digital video recorder, also known as a PVR—personal video recorder).

The remaining content (other than the advertisements) is then passed to the advertisement processor 42 which determines whether an advertisement embedded in the content should be directly played as received or if an advertisement should be extracted from advertisement cache 38 for substitution into the current output stream. Advertisement processor 42 may be implemented using a programmed processor operating under control of software or firmware instructions embedded within the receiver device 24. The content along with the advertisement deemed appropriate by the advertisement processor is then passed to the decoder 46 which decodes the digital data packets (and may additionally incorporate decryption functions) and passes the decoded and decrypted content to a television interface 50. Television interface 50 places the content into a format suitable for display on a television receiver 28 or similar display. For example, television interface 50 may convert the digital output of decoder 46 into NTSC compliant video or may convert it into PAL, composite video, S-video, IEEE 1394 data or any other suitable analog or digital video format.

Figure 2:
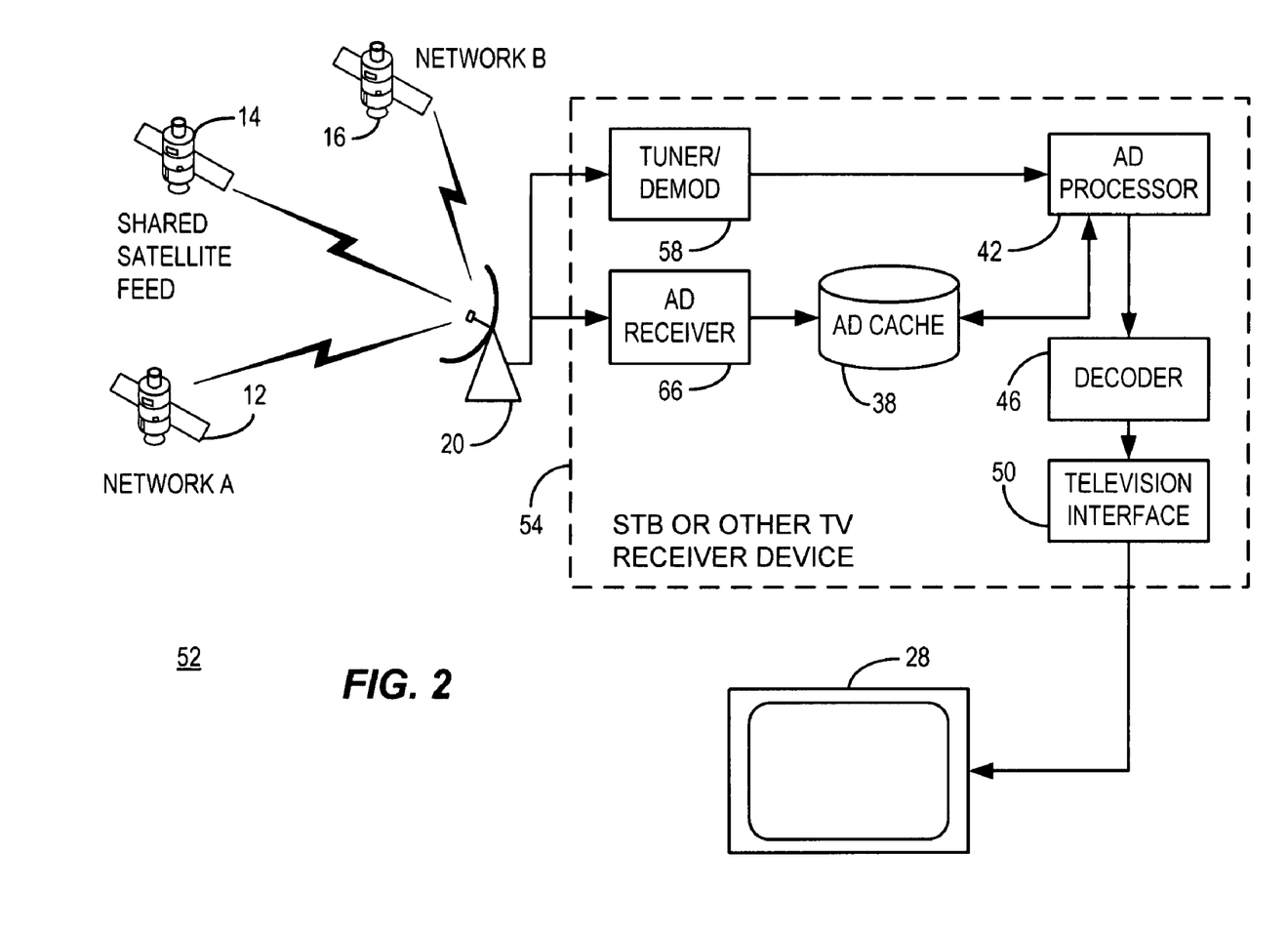
FIG. 2 is a block diagram of a system consistent with certain embodiments of the present invention.

Referring now to FIG. 2, an alternative embodiment is depicted having an alternative structure for a set-top box or other TV receiver device 54. As with the previous example, three separate satellites are depicted as providing content from network A at satellite 12, shared satellite information at satellite 14, and network B content at satellite 16. This information is received from satellites 12, 14, and 16 by satellite antenna and low noise block 20 which passes the received signal to receiver device 54's tuner/demodulator 58 and advertisement receiver (also incorporating a tuner and demodulator) 66.

In this embodiment, receiver device 54 incorporates tuner/demodulator 58 that tunes to desired channels under direction of the user, as with a conventional television set-top box. Receiver device 54 further incorporates a separate advertisement receiver (tuner/demodulator) 66. Thus in the present network, advertisements are received over, for example, a dedicated advertisement channel or opportunistically received by monitoring the other network programming, utilizing a separate receiver and provided to advertisement cache 38. Again, in this example, advertisement processor 42 selects an appropriate advertisement for the content selected by the user and passes it to decoder 46. Decoder 46 in turn passes decoded and decrypted content to television interface 50 which interfaces to a display or television receiver 28.

Advertisements can be captured for caching in any number of ways, including but not limited to, the following:

- A special "advertisement stream" can be transmitted from one or more satellite feeds. The receiver can tune to the channel carrying the advertisement stream when not in use to download ads for the next day. Alternatively, a special tuner can be used to listen to the ad stream continually (e.g., as in FIG. 2).
- Each stream can have an "ad channel" which can be tuned while watching content. The advertisements can be recorded in the background.
- Advertisements can also be captured opportunistically from adjoining channels as they are displayed as "main advertisings". These would not be for the "other" network but would provide a faster way to collect advertisements in certain scenarios.
- Advertisements are captured only from the channel tuned and stored for possible later use.

Advertisements that are specific to a particular network (or advertisements in general) can be marked using meta-data so that the receivers can manage memory more efficiently. Content can be tagged with meta-data such as the following (by way of example—other meta-data can be added or removed for other embodiments):

| | |
|---|---|
| Ad ID | (an advertisement identifier) |
| # of times it will run on the network | |
| Save or Delete | (if run as primary ad) |
| Delete after Date | (Ad will not likely run again after this date) |
| Network ID | (Identifier of network associated with advertisement) |
| Program association | (for example, run with "Bonanza") |
| Channel Association | (for example, run on "Spike TV") |

Other data may also be used as a part of meta-data associated with advertisements. Network Meta-data sent to the set-top box or other television receiver device from the "other network" can call out a particular advertisement using "Ad ID". If that ad is not actually present on the hard drive, the receiver can decide which other ad that is stored might be displayed using any variety of techniques such as calling out a "default ad" in case the desired ad is missed, or defining rules or priorities for the type of ad that is to be run in the event of failure to identify an advertisement in the stored advertisement cache.

While the present embodiments may ask adversaries to cooperate to a certain extent, they continue to allow each network to run their own network advertisements and allows Satellites to re-capture more bandwidth in order to be more competitive with Cable, the Telcos (with IPTV), and even the Internet. This permits satellite television service providers to introduce new bandwidth hungry services to keep competitive with other technologies such as cable. This further permits conservation and sharing of the huge cost of satellite bandwidth while supporting the desire to provide more services in HD and Local-in-local programming. As satellite service operators undertake the costly upgrade to AVC to provide more bandwidth, the arrangement described herein provides a cost effective mechanism to provide even more bandwidth without the expense of sending up more satellites as well.

In accordance with certain embodiments consistent with the present invention network feed is simulated even though the bandwidth is shared. Network ads appear as they would on the original feed. Advertisements are captured and played at the appropriate time when a network ad is allowed to run.

While there exists possible issues surrounding the customer watching certain channels that might belong to the other network, workarounds are provided in which, for example, the receiver de-tunes occasionally to go get ads from the other network if the other approaches (ad program) is not possible (for the other network).

As described above, meta-data can be utilized to determine which advertising is to be associated with which content from a particular network. In the case where a special advertisement stream is utilized, advertisement receiver 66, for example, can be utilized to capture the advertisements and place them into the advertisement cache. Other variations will occur to those skilled in the art upon consideration of the present teachings.

Figure 3:
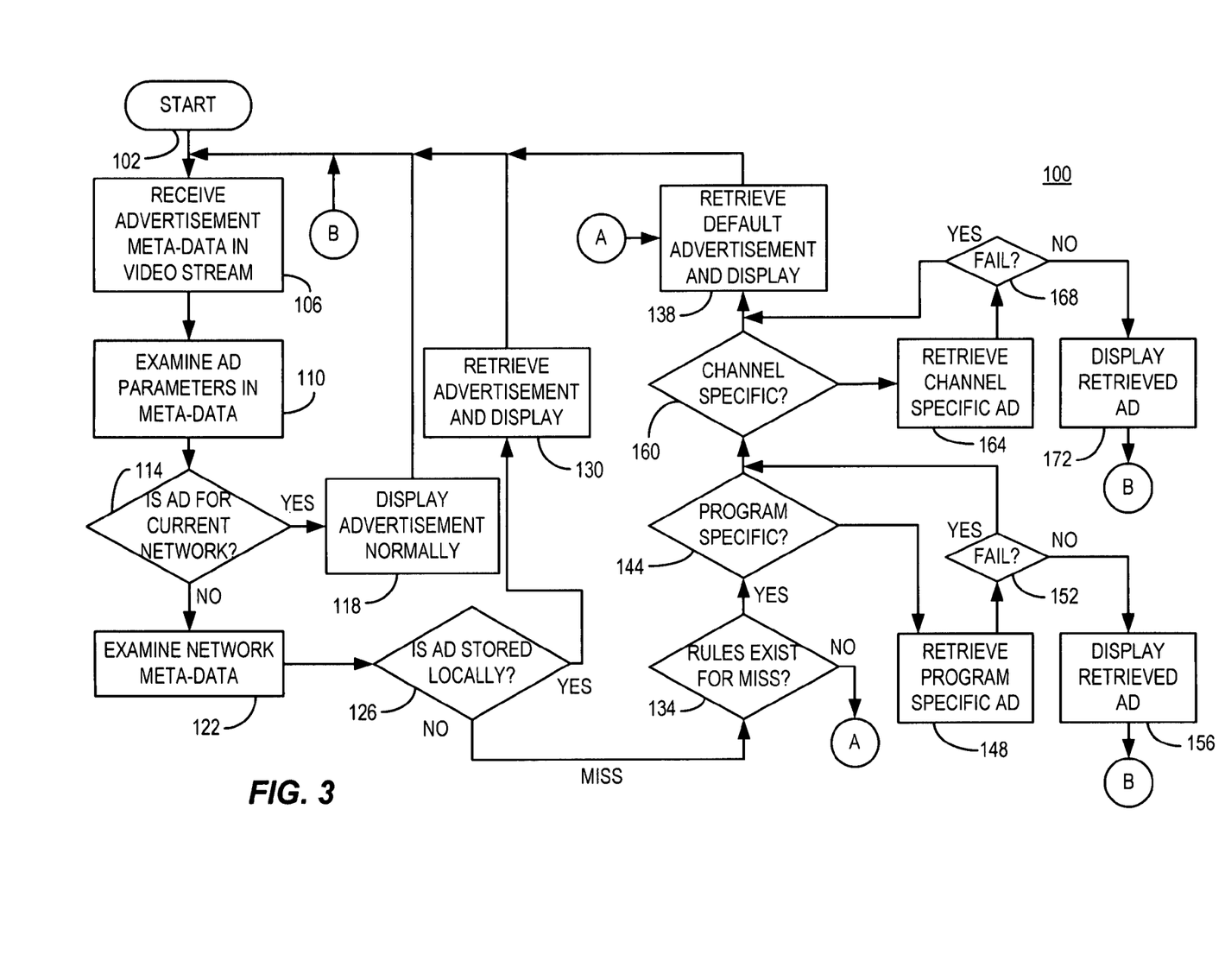
FIG. 3 is a flow chart of a process consistent with certain embodiments of the present invention.

One exemplary process for retrieving advertisements and associating such advertisements with their intended programming content is depicted as process 100 of FIG. 3. Any of the mechanisms described above can be utilized to store the advertisements in the advertisement cache, and since the advertisements will generally require only a small amount of storage per advertisement, relatively large numbers of advertisements can be stored without consuming an inordinate amount of storage space. This is furthermore the case in view of the fact that most advertisements are run repeatedly, so that even if 20% of actual viewing time is consumed by advertisements, individual advertisements may be run many times so that the actual amount of viewing time storage necessary to store the advertisement content remains very small.

Process 100, of FIG. 3, starts at 102 after which advertisement meta-data is received in the video stream (or as a separate stream of advertisements). If a program incorporates an advertisement in its video stream, its advertisement meta-data as received in 106 will provide information for use by the set-top box a advertisement processor 42 to determine whether or not the advertisement embedded in the video stream is to be utilized or if some other advertisement is to be utilized.

To more clearly understand this, it is presumed that certain of the content will carry advertisements associated with network A, while certain of the content will carry advertisements associated with network B if this content is broadcast by the shared satellite feed depicted at satellite 14 in the examples shown previously. Thus, if a subscriber subscribes to network A, he may receive content which is formatted as network A content and which would be passed directly to his decoder and television interface 46 and 50 without modification of the advertisement content. However, since a subscriber to network A may also receive content formatted for direct playback by subscribers to network B, the advertisement processor 42 is utilized to make a determination of what advertisement content should be substituted for the advertisement provided by network B to a network A subscriber.

Thus, if the video stream is associated with the current network (i.e. the network to which the subscriber subscribes), the set-top box or other receiver device, such as 24 or 54, will function much as a conventional set-top box receiver device currently functions. However, in the event the content is formatted for an alternative network, such as network B to a network A subscriber, additional processing is utilized to make a substitution of the advertisement content.

When an advertisement is received in a video data stream at 106, the advertisement parameters present in the meta-data are examined at 110. A determination is then made at 114 as to whether or not the advertisement is associated with the current network (that is the network to which the receiver is associated and the consumer subscribes). If so, the advertisement is displayed normally at 118 and control returns to 106 to await the next advertisement present in the video stream.

However, at 114, if the advertisement is not associated with the subscriber's network, the network meta-data is examined at 122 to determine what advertisement is appropriate for display in the subscriber's current network. The advertisement processor then at 126 determines whether or not the advertisement specified by the meta-data is stored locally at 126. If so, the advertisement is simply retrieved from the advertisement cache 38 and displayed in place of (i.e., substituted for) the advertisement received in the video stream. Control then passes to 102 as if the advertisement had been originally embedded in the video stream.

If the advertisement is not stored locally as determined at 126, the ad processor deems that a "miss" has been encountered, and further processing is carried out to determine how to handle the "miss." In this example, control passes to 134 to determine if rules have been established for a process in the event of a miss. Such rules may be built into the set top box or may be defined in the metadata (e.g., by association with a channel or with a program). If no such rules have been established, control passes to 138. At 138, a default advertisement which is stored, for example, at the time of initiation of service using the set-top box or other receiver device, is retrieved and displayed, and control then returns to 106. In other embodiments, default advertisements can be periodically updated by broadcasting such updated default advertisements (which may be one or a collection of advertisements) using the specialized advertisement stream or by opportunistically transmitting such advertisements on a relatively frequent basis, along with the programming material. In this case, meta-data can be used to identify the advertisement as a default advertisement (e.g. by another meta-data element or by use of a special range of network advertisement IDs, etc.). Those skilled in the art will appreciate upon consideration of the present teachings that any number of arrangements for providing one or more default advertisements and updating such advertisements can be devised. The term "default" as used herein refers to an advertisement used in the event a specified advertisement or rule designated advertisement is unavailable for any reason.

Any number of actions can be carried out by virtue of establishment of rules for handling a miss. In the embodiment depicted in process 100, two such rules are shown by way of example, but many other rules could be provided and embedded in meta-data. Accordingly, the examples provided should be considered merely illustrative and not limiting in any way.

One example rule which exists if a miss is encountered is determined at 142 whether or not the advertisement retrieved should be considered specific to a particular program at 144. In other words, an advertisement can be stored in the cache which is specific to the evening news, prime time program, or a particular program such "Bonanza". In this case, meta-data specifying any program name or other identification is the equivalent of a rule designating that the advertisement is to be shown during that program.

If a program specific rule has been established, control passes from 144 to 148 where the program specific advertisement is retrieved. In these examples, retrieval is of course dependent upon whether or not the program specific advertisement resides in the advertisement cache 38. Accordingly, there is the possibility that the advertisement does not exist. In this case, a failure will be encountered. If no failure is encountered at 152, the retrieved advertisement is displayed in place of the advertisement received along with the content at 156, and control passes back to 106.

If the retrieval process fails at 152, or if no program specific rule exists at 144, another example rule is depicted. In this example, there may be a channel specific rule designated at 160. In this example, a retrieval is attempted for a channel specific advertisement at 164 (by virtue of a "rule" in the meta-data that identifies a channel). If the channel specific advertisement is stored in cache 38, then no failure is likely to be encountered at 168, and the advertisement is displayed at 172, following which control passes back to 106 to await an additional advertisement embedded in the video stream. However, if a failure is encountered at 168, or if there is channel specific rule, control passes to 138 where a default advertisement is again retrieved and displayed, and control passes to 106.

While the present illustrative embodiment provides that there may two rules (channel specific and program specific), other types of rules may also be devised. By way of example, a rule may be time specific, day specific, subscriber specific, subscriber class specific, or targeted to a particular demographic associated with a subscriber. Moreover, rules can be established that are used in conjunction with one another (e.g., a collection of rules can specify that an advertisement is to be shown only on Spike TV™, when "Bonanza" is playing after 9:00 PM for a particular subscriber class, etc.). Those skilled in the art will appreciate that many such rules can be devised and incorporated within the meta-data and will understand that the illustrative meta-data provided as an example above is merely illustrative and is not to be considered to be limiting in any way.

It is also noted that the rules as depicted in FIG. 3 are arranged in a hierarchical manner in that a program specific rule will be encountered prior to a channel specific rule. Thus in the depiction of FIG. 3, a program specific rule would take priority over a channel specific rule in the sequential arrangement depicted. Thus, by arrangement of an appropriate sequential examination for potential rules, a system can be devised in which certain types of rules inherently have a priority over other types of rules. However, this too is not to be considered limiting. In general, process 200 of FIG. 4 can be used to parse the meta-data to identify an appropriate rule or set of rules to apply (this process substitutes into process 100 for the program and channel specific rule processing). In this case, if a meta-data specified advertisement is not available at 126, the meta data is parsed at 210 to identify an appropriate advertisement. If the advertisement is stored locally at 226, control passes to 230 where the specified ad is retrieved and displayed after which control passes to 106 of process 100. If the ad is not stored locally at 226, control passes to 138 for retrieval and display of a default advertisement.

Figure 4:
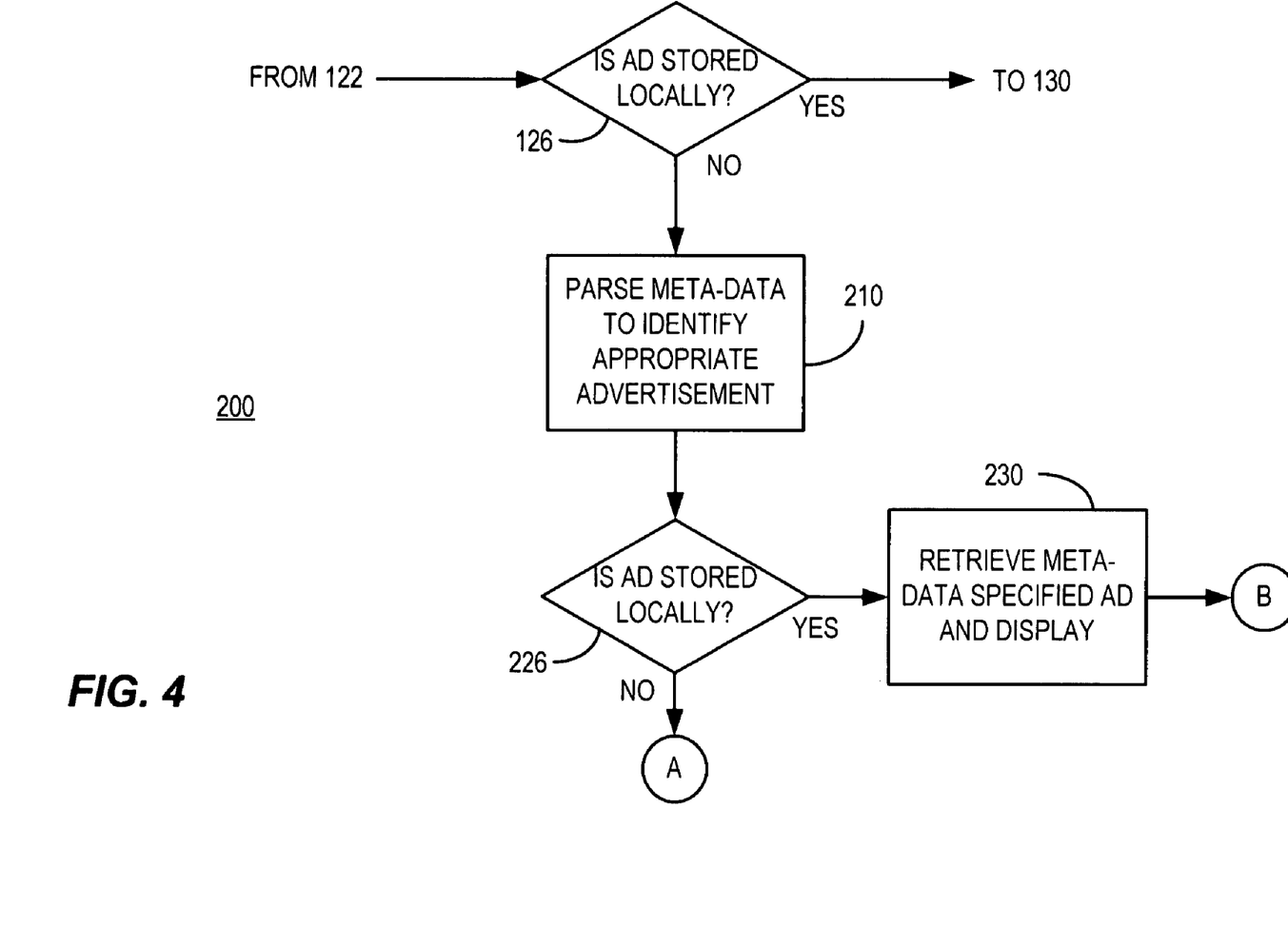
FIG. 4 is a flow chart of a generalized method for parsing meta-data rules consistent with certain embodiments of the present invention.

The meta-data associated with any given advertisement may further incorporate a priority for rules that can be utilized to find an appropriate advertisement for display in place of the advertisement present in the video stream. Such priorities can be handled during the meta-data parsing of 210. Additionally, priorities could be established in the firmware or software of set-top box or receiving devices 24 or 54. Such priorities may also be user dependent, user class dependent, demographically dependent, or established in any suitable way without departing from embodiments consistent with the present invention. Many variations will occur to those skilled in the art upon consideration of the present teachings.

Thus, a method for bandwidth sharing between first and second satellite television networks in a satellite television system carried out at a first satellite television network receiver, in a manner consistent with certain embodiments involves receiving a shared video data stream shared between the first and second satellite television networks; receiving advertisement metadata forming a part of the shared video data stream, the advertisement meta-data containing identifying information that identifies the advertisement as being associated with one of the first and second satellite television networks; determining which of the first and second satellite television networks the advertisement is associated with by reading the identifying information; if the first satellite television network is identified as associated with the advertisement, then outputting the advertisement as a video signal; and if the second satellite television network is identified as associated with the advertisement, then identifying an advertisement that is possibly stored in an advertisement cache, retrieving the advertisement from the advertisement cache and outputting the stored advertisement as a video signal.

A receiver apparatus for bandwidth sharing between first and second satellite television networks in a satellite television system, the receiver apparatus being used for receiving subscription services from a first satellite television network, the receiver apparatus has a digital satellite receiver that receives a shared video data stream, the shared video data stream being shared between the first and second satellite television networks. The shared video data stream contains advertisement metadata, the advertisement meta-data contains identifying information that identifies the advertisement as being associated with one of the first and second satellite television networks. An advertisement cache stores advertisements. An advertisement processor determines which of the first and second satellite television networks the advertisement is associated with by reading the identifying information in the meta-data. The advertisement processor operates to: output the advertisement as a video signal if the first satellite television network is identified as associated with the advertisement; and identify an advertisement that is possibly stored in the advertisement cache, retrieve the advertisement from the advertisement cache and output the stored advertisement as a video signal, if the second satellite television network is identified as associated with the advertisement.

In certain embodiments, the advertisement processor identifies an advertisement that is possibly stored in the advertisement cache by determining an advertisement identifier from the advertisement meta-data to identify the stored advertisement. In certain embodiments, the advertisement processor identifies an advertisement that is possibly stored in the advertisement cache by identifying a default advertisement. In certain embodiments, the default advertisement is selected from a plurality of stored default advertisements. In certain embodiments, the advertisement processor identifies an advertisement that is possibly stored in the advertisement cache by applying a rule. In certain embodiments, the rule is a rule associating the stored advertisement with a specified television program or a specified television channel. In certain embodiments, the rule is invoked in the event of a failure to retrieve an advertisement from the advertisement cache. In certain embodiments, a network advertisement filter stores advertisements in the advertisement cache. In certain embodiments, an advertisement receiver receives advertisements and stores the advertisements in the advertisement cache. In certain embodiments, the advertisement processor the digital satellite receiver receives advertisements that are stored in the advertisement cache. In certain embodiments, the digital satellite receiver receives advertisements by tuning to a specified advertisement stream. Many variations and alternative embodiments will occur to those skilled in the art upon consideration of the present teachings.

Therefore, by way of example, over 65% of the content offerings is the same between DirecTV™ and EchoStar™. If this content could be physically shared between the two operators, the savings could be enormous. Additionally, at this writing, operators are in the process of converting millions of set-top boxes to AVC. In certain embodiments, if satellite receivers can utilize key sharing and provide PVR capabilities, network specific ads could be cached, Network specific ads can be cached on a hardware drive which permits, for example: a DirecTV™ receiver can substitute a DirecTV network ad from the hard drive for an EchoStar™ network ad while tuned to an EchoStar™ "shared" satellite feed. Similarly, an EchoStar™ receiver can substitute an EchoStar™ network ad from the hard drive for DirecTV™ network ad while tuned to an DirecTV™ "shared" satellite feed. (These specific commercial networks are used by way of example only, and are not to be considered limiting.) In order for accomplish the above, the specific network ads can be cached ahead for use when the ad is displayed.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry or functional blocks that carry out the functions described, embodiments are contemplated in which the circuit functions are carried out using hardware, or using software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method for bandwidth sharing between first and second satellite television networks where the first and second satellite television networks are each associated with separate competing direct broadcast satellite service providers, the method being carried out at a first satellite television network receiver and comprising:

receiving a shared video data stream shared between the first and second satellite television networks via a shared satellite feed shared by the first and second satellite television networks;

receiving advertisement metadata forming a part of the shared video data stream, the advertisement meta-data containing identifying information that identifies the advertisement as being associated with one of the first and second satellite television networks;

storing at least a portion of the shared video data stream in an advertisement cache;

determining which of the first and second satellite television networks the advertisement is associated with by reading the identifying information;

if the first satellite television network is identified as associated with the advertisement, then outputting the advertisement as a video signal; and if the second satellite television network is identified as associated with the advertisement, then identifying an advertisement that is possibly stored in the advertisement cache, retrieving the advertisement from the advertisement cache and outputting the stored advertisement as a video signal.

2. The method according to claim 1, wherein identifying an advertisement that is possibly stored in the advertisement cache comprises determining an advertisement identifier from the advertisement meta-data to identify the stored advertisement.

3. The method according to claim 1, wherein identifying an advertisement that is possibly stored in the advertisement cache comprises identifying a default advertisement.

4. The method according to claim 3, wherein the default advertisement is selected from a plurality of stored default advertisements.

5. The method according to claim 1, wherein identifying an advertisement that is possibly stored in the advertisement cache comprises identifying an advertisement specified by a rule.

6. The method according to claim 5, wherein the rule comprises a rule associating the stored advertisement with a specified television program.

7. The method according to claim 5, wherein the rule comprise a rule associating the stored advertisement with a specified television channel.

8. The method according to claim 5, wherein the rule is invoked in the event of a failure to retrieve an advertisement from the advertisement cache.

9. A non-transitory computer readable storage medium storing instructions which, when executed on one or more programmed processors, carries out a method according to claim 1.

10. A method for bandwidth sharing between first and second satellite television networks where the first and second satellite television networks are each associated with separate competing direct broadcast satellite service providers, the method being carried out at a first satellite television network receiver and comprising:

receiving a shared video data stream shared between the first and second satellite television networks via a shared satellite feed shared by the first and second satellite television networks;

receiving advertisement metadata forming a part of the shared video data stream, the advertisement meta-data containing identifying information that identifies the advertisement as being associated with one of the first and second satellite television networks;

storing at least a portion of the shared video data stream in an advertisement cache;

determining which of the first and second satellite television networks the advertisement is associated with by reading the identifying information;

if the first satellite television network is identified as associated with the advertisement, then outputting the advertisement as a video signal;

if the second satellite television network is identified as associated with the advertisement, then identifying an advertisement that is possibly stored in the advertisement cache, retrieving the advertisement from the advertisement cache and outputting the stored advertisement as a video signal;

wherein identifying an advertisement that is possibly stored in the advertisement cache comprises determining an advertisement identifier from the advertisement meta-data to identify the stored advertisement, and, wherein in the event the advertisement identified by the meta-data is not stored in the advertisement cache, the identifying further comprises identifying at least one of a default advertisement and an advertisement specified by a rule.

11. The method according to claim 10, wherein the rule comprises a rule associating the stored advertisement with at least one of a specified television program and a specified television channel.

12. The method according to claim 10, wherein the default advertisement is selected from a plurality of stored default advertisements.

13. A non-transitory computer readable storage medium storing instructions which, when executed on one or more programmed processors, carries out a method according to claim 10.

14. A receiver apparatus for bandwidth sharing between first and second satellite television networks where the first and second satellite television networks are each associated with separate competing direct broadcast satellite service providers, the receiver apparatus being used for receiving subscription services from a first satellite television network, the receiver apparatus comprising:

a digital satellite receiver that receives a shared video data stream, the shared video data stream being shared between the first and second satellite television networks via a shared satellite feed;

the shared video data stream containing advertisement metadata, the advertisement meta-data containing identifying information that identifies the advertisement as being associated with one of the first and second satellite television networks;

an advertisement cache that stores advertisements;

an advertisement processor that determines which of the first and second satellite television networks the advertisement is associated with by reading the identifying information in the meta-data, and wherein the advertisement processor operates to:

output the advertisement as a video signal if the first satellite television network is identified as associated with the advertisement; and identify an advertisement that is possibly stored in the advertisement cache, retrieve the advertisement from the advertisement cache and output the stored advertisement as a video signal, if the second satellite television network is identified as associated with the advertisement.

15. The receiver apparatus according to claim 14, wherein the advertisement processor identifies an advertisement that is possibly stored in the advertisement cache by determining an advertisement identifier from the advertisement meta-data to identify the stored advertisement.

16. The receiver apparatus according to claim 14, wherein the advertisement processor identifies an advertisement that is possibly stored in the advertisement cache by identifying a default advertisement.

17. The receiver apparatus according to claim 16, wherein the default advertisement is selected from a plurality of stored default advertisements.

18. The receiver apparatus according to claim 14, wherein the advertisement processor identifies an advertisement that is possibly stored in the advertisement cache by applying a rule.

19. The receiver apparatus according to claim 18, wherein the rule comprises a rule associating the stored advertisement with a specified television program.

20. The receiver apparatus according to claim 18, wherein the rule comprise a rule associating the stored advertisement with a specified television channel.

21. The receiver apparatus according to claim 18, wherein the rule is invoked in the event of a failure to retrieve an advertisement from the advertisement cache.

22. The receiver apparatus according to claim 14, further comprising a network advertisement filter that stores advertisements in the advertisement cache.

23. The receiver apparatus according to claim 14, further comprising an advertisement receiver that receives advertisements and stores the advertisements in the advertisement cache.

24. The receiver apparatus according to claim 14, wherein the digital satellite receiver receives advertisements that are stored in the advertisement cache.

25. The receiver apparatus according to claim 24, wherein the digital satellite receiver receives advertisements by tuning to a specified advertisement stream.

* * * * *